(12) United States Patent
Tang

(10) Patent No.: US 11,606,181 B2
(45) Date of Patent: Mar. 14, 2023

(54) DATA TRANSMISSION METHOD AND APPARATUS

(71) Applicant: Huawei Technologies Co., Ltd., Shenzhen (CN)

(72) Inventor: Zhihua Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 17/098,061

(22) Filed: Nov. 13, 2020

(65) Prior Publication Data

US 2021/0119754 A1    Apr. 22, 2021

Related U.S. Application Data

(63) Continuation of application No. PCT/CN2018/087147, filed on May 16, 2018.

(51) Int. Cl.
*H04W 4/00* (2018.01)
*H04L 5/00* (2006.01)
(Continued)

(52) U.S. Cl.
CPC ......... *H04L 5/0055* (2013.01); *H04B 17/318* (2015.01); *H04L 1/1812* (2013.01);
(Continued)

(58) Field of Classification Search
None
See application file for complete search history.

(56) References Cited

U.S. PATENT DOCUMENTS

2008/0248793 A1   10/2008  Chang et al.
2010/0039948 A1*   2/2010  Agrawal ............ H04W 72/082
                                         370/252
(Continued)

FOREIGN PATENT DOCUMENTS

CN        102017508 A      4/2011
CN        104160772 A     11/2014
(Continued)

OTHER PUBLICATIONS

"On Hybrid ARQ functionality for 5G," 3GPP TSG-RAN WG1 #85, Nanjing, P.R. China, R1-165373, total 3 pages, 3rd Generation Partnership Project, Valbonne, France (May 23-27, 2016).
(Continued)

*Primary Examiner* — Bob A Phunkulh
(74) *Attorney, Agent, or Firm* — Leydig, Voit & Mayer, Ltd.

(57) ABSTRACT

A data transmission method and apparatus are provided. The method includes: sending, by a digital unit (DU), first uplink scheduling information to a radio unit (RU); receiving a predicted decoding result from the RU; receiving uplink data from a terminal, and decoding the uplink data to obtain an actual decoding result; and performing, by the DU, an error remedy for uplink data transmission based on the actual decoding result and the predicted decoding result. The decoding result is predicted, and scheduling information for data transmission is adjusted based on the predicted decoding result, thereby improving data transmission reliability, so that a data transmission latency in a relaxed latency communication scenario can be met, data transmission can be normally performed, and an interface of a base station after a re-split can be normally used, thereby reducing a bandwidth requirement on the interface.

12 Claims, 9 Drawing Sheets

(51) Int. Cl.
   *H04B 17/318*    (2015.01)
   *H04L 1/1812*    (2023.01)
   *H04W 72/04*     (2023.01)
   *H04W 72/1268*   (2023.01)
   *H04W 72/12*     (2023.01)
   *H04L 1/00*      (2006.01)

(52) U.S. Cl.
   CPC ..... *H04W 72/042* (2013.01); *H04W 72/1268* (2013.01); *H04W 72/1289* (2013.01); *H04L 1/0003* (2013.01)

(56) References Cited

U.S. PATENT DOCUMENTS

| | | | | |
|---|---|---|---|---|
| 2010/0315957 | A1* | 12/2010 | Koo | H04B 7/15592 455/67.11 |
| 2011/0085457 | A1* | 4/2011 | Chen | H04L 5/0053 370/252 |
| 2013/0242772 | A1* | 9/2013 | Attar | H04B 7/0877 370/252 |
| 2013/0322349 | A1* | 12/2013 | Hosangadi | H04L 5/006 370/329 |
| 2014/0086206 | A1* | 3/2014 | Miyata | H04W 72/0446 370/330 |
| 2015/0016282 | A1* | 1/2015 | Su | H04W 36/0085 370/252 |
| 2017/0251461 | A1* | 8/2017 | Parkvall | H04L 5/0055 |
| 2017/0280477 | A1  | 9/2017 | Martin et al. | |
| 2018/0026755 | A1  | 1/2018 | Meng | |
| 2018/0076914 | A1* | 3/2018 | Zhou | H04L 41/0843 |
| 2018/0091248 | A1* | 3/2018 | Callard | H04J 11/0023 |
| 2018/0234991 | A1* | 8/2018 | Becvar | H04W 72/04 |
| 2018/0248787 | A1* | 8/2018 | Rajagopal | H04L 45/70 |
| 2018/0310255 | A1* | 10/2018 | Simonsson | H04W 52/245 |
| 2019/0116524 | A1* | 4/2019 | Isogawa | H04W 72/1231 |
| 2020/0304233 | A1* | 9/2020 | Garcia | H04L 1/0015 |
| 2021/0119674 | A1* | 4/2021 | Yuan | H04B 7/0456 |
| 2021/0184752 | A1* | 6/2021 | Liao | H04B 7/0617 |

FOREIGN PATENT DOCUMENTS

| | | |
|---|---|---|
| CN | 106922030 A | 7/2017 |
| WO | 2017107106 A1 | 6/2017 |

OTHER PUBLICATIONS

Berardinelli et al., "On the benefits of early HARQ feedback with non-ideal prediction in 5G networks," 2016 International Symposium on Wireless Communication Systems (ISWCS), total 5 pages, (Oct. 20, 2016).

"Early Hybrid ARQ Feedback for the 5G New Radio," 3GPP TSG-RAN WG1#87, Reno, NV, USA, R1-1612249, Total 7 pages, 3rd Generation Partnership Project, Valbonne, France (Nov. 14-18, 2016).

"Enhanced HARQ for NR," 3GPP TSG RAN WG1 Meeting #88, Athens, Greece, R1-1702372, pp. 1-4, 3rd Generation Partnership Project, Valbonne, France (Feb. 13-17, 2017).

Sahlin, "Channel Prediction for Link Adaptation in LTE Uplink," 2012 IEEE Vehicular Technology Conference (VTC Fall), total 5 pages, Institute of Electrical and Electronics Engineers, New York, New York (Sep. 3-6, 2012).

* cited by examiner

DATA TRANSMISSION METHOD AND APPARATUS

CROSS-REFERENCE TO RELATED APPLICATIONS

This application is a continuation of International Application No. PCT/CN2018/087147, filed on May 16, 2018, the disclosure of which is hereby incorporated by reference in its entirety.

TECHNICAL FIELD

This application relates to the field of communications technologies, and in particular, to a data transmission method and apparatus.

BACKGROUND

As a mainstream interface type between a digital unit (DU) and a radio unit (RU), a common public radio interface (CPRI) has been widely applied to fronthaul networks in 2G/3G/4G base station products (fronthaul networks). When a large bandwidth and massive multiple-input multiple-output (massive MIMO) technology for 4.5G/5G emerges, a bandwidth of the CPRI interface is greatly increased. The massive MIMO already supports 64T64R. As a result, an amount of data in time domain increases sharply, and a requirement on capacities of the interface far exceeds transmission capabilities of most operator sites, which pose great pressure on costs of commercial deployment and availability of site transmission resources. Therefore, a new solution is certainly required to reduce a requirement on the bandwidth of the CPRI interface.

Therefore, a re-split technology of an interface of a base station is developed, which can effectively reduce a requirement on transmission bandwidth of the fronthaul network and reduce transmission cost. FIG. 1 is a schematic diagram of a re-split of an interface of a base station. Protocol stack layers of an interface are split. After the split, protocol stack layers on the left are implemented in a DU, and protocol stack layers on the right are implemented in an RU. FIG. 1 shows eight split options (option 1 to option 8). There are different split policies in different scenarios. Each policy has its own advantages and disadvantages. A closer distance between a splitting point and a radio frequency (RF) indicates that more functions are centralized in the DU, so that the DU can better implement coordination-based features such as interference coordination and joint scheduling, and achieve better performance, while a higher requirement on a transmission bandwidth and a higher requirement on latency are required (where the latency is required to be lower. For example, latency of dozens of microseconds is not favorable for remote radio and DU centralized deployment). A farther distance between the splitting point and the RF indicates that fewer functions are centralized in the DU, and lower support for the coordination-based features, while a lower requirement on a transmission bandwidth and a lower requirement on latency are required, and millisecond-level latency can be supported.

To achieve coordination performance and meet a fronthaul bandwidth requirement, for example, a split solution of option 7, that is, intra-PHY split, may be considered. However, in this solution, the fronthaul latency is still required, and only a maximum transmission latency of 100 us is allowed. Due to the latency, lengths of optical fibers between DUs and RUs are limited. As a result, the DUs cannot be deployed on a large scale in a centralized manner, which is not conducive to the transformation to cloud computing for base stations of operators. Consequently, advantages of the cloud computing cannot be fully utilized to reduce operation and maintenance costs of the operators.

To resolve this problem, the fronthaul network with a relaxed latency (a maximum of dozens of milliseconds) is used and the fronthaul network is carried on an IP network. However, after the fronthaul network with the relaxed latency is used, a conventional latency for a hybrid automatic repeat request (HARQ) at a physical layer cannot meet a requirement. As a result, a HARQ function cannot be implemented according to the protocol requirements, and a throughput is affected. Therefore, a HARQ solution needs to be optimized based on a relaxed latency scenario.

Therefore, in a relaxed latency communication scenario, how to perform data transmission is a problem that currently needs to be resolved.

SUMMARY

Embodiments of this application provide a data transmission method and apparatus, to resolve a problem of how to meet a data transmission latency in a relaxed latency communication scenario, so that data transmission can be normally performed, and an interface of a base station after a re-split can be normally used, thereby reducing a bandwidth requirement on the interface.

According to a first aspect, a data transmission method is provided, including: receiving, by a radio unit RU, first uplink scheduling information from a digital unit DU; predicting, by the RU based on a pilot signal estimation result of uplink data and/or at least one piece of historical information, a decoding result of the uplink data received by a base station; obtaining, by the RU, second uplink scheduling information based on a predicted decoding result and the first uplink scheduling information; sending, by the RU, the predicted decoding result and the second uplink scheduling information to a terminal; and sending, by the RU, the predicted decoding result to the DU.

In this aspect, the decoding result is predicted, and scheduling information for data transmission is adjusted based on the predicted decoding result, thereby improving data transmission reliability, so that a data transmission latency in a relaxed latency communication scenario can be met, data transmission can be normally performed, and an interface of a base station after a split can be normally used, thereby reducing a bandwidth requirement on the interface.

With reference to the first aspect, in a first possible implementation, the predicting, by the RU based on a pilot signal estimation result of uplink data and/or at least one piece of historical information, a decoding result of the uplink data received by a base station includes: estimating, by the RU, a signal to interference plus noise ratio SINR based on the pilot signal estimation result of the uplink data; calibrating, by the RU based on the SINR obtained by estimation and a calibration deviation $SINR_{adj}$ of the SINR, the SINR obtained by estimation; obtaining, by the RU, a block error rate BLER based on the at least one piece of historical information, a calibrated SINR, and a mapping relationship between an SINR and a BLER; and generating, by the RU, the predicted decoding result based on the obtained BLER.

In this implementation, because the RU can obtain, in a most timely manner, data sent by the terminal, and the RU can obtain channel information in a most timely manner, the decoding result of the uplink data can be accurately predicted based on the pilot signal estimation result of the uplink data and/or the at least one piece of historical information.

With reference to the first aspect or the first possible implementation of the first aspect, in a second possible implementation, the at least one piece of historical information includes: statistical information of a modulation and coding scheme MCS, a resource block RB, doppler, and the predicted decoding result.

With reference to the first aspect, the first possible implementation of the first aspect, or the second possible implementation of the first aspect, in a third possible implementation, the predicted decoding result includes a positive acknowledgment ACK and a negative acknowledgment NACK, and the obtaining, by the RU, second uplink scheduling information based on a predicted decoding result and the first uplink scheduling information includes: determining, by the RU, that the second uplink scheduling information is the first uplink scheduling information if the predicted decoding result is the ACK; or modifying the first uplink scheduling information to obtain the second uplink scheduling information if the predicted decoding result is the NACK.

In this implementation, the uplink scheduling information is adjusted in a timely manner based on the predicted decoding result, so that data transmission reliability can be improved, and data transmission latency in a relaxed latency communication scenario can be met.

With reference to the third possible implementation of the first aspect, in a fourth possible implementation, the modifying the first uplink scheduling information to obtain the second uplink scheduling information if the predicted decoding result is the NACK includes: if the predicted decoding result is the NACK, and the first uplink scheduling information includes scheduling information of the terminal, determining, by the RU, that the second uplink scheduling information is to schedule the terminal to perform retransmission by using an initial transmission scheduling resource; or if the predicted decoding result is the NACK, and the first uplink scheduling information does not include scheduling information of the terminal, determining, by the RU based on whether a resource scheduled by the terminal in a previous retransmission transmission time interval TTI is occupied by another terminal in a current TTI, that the second uplink scheduling information is to schedule the terminal to perform non-adaptive retransmission or suspend a retransmission process of the terminal.

According to a second aspect, a data transmission method is provided, including: sending, by a digital unit DU, first uplink scheduling information to a radio unit RU; receiving, by the DU, a predicted decoding result from the RU; receiving, by the DU, uplink data from a terminal, and decoding the uplink data to obtain an actual decoding result; and performing, by the DU, an error remedy for uplink data transmission based on the actual decoding result and the predicted decoding result.

In this aspect, in uplink transmission, the RU predicts the decoding result, and adjusts scheduling information for data transmission based on the predicted decoding result, thereby improving data transmission reliability, so that a data transmission latency in a relaxed latency communication scenario can be met, data transmission can be normally performed, and an interface of a base station after a re-split can be normally used, thereby reducing a bandwidth requirement on the interface. The DU performs the error remedy for the uplink data transmission based on the actual decoding result and the predicted decoding result, so that the data transmission reliability can be further improved.

With reference to the second aspect, in a first possible implementation, the performing, by the DU, an error remedy for uplink data transmission based on the actual decoding result and the predicted decoding result includes: if the actual decoding result is a positive acknowledgment ACK and the predicted decoding result is a negative acknowledgment NACK, determining, by the DU, that the predicted decoding result is falsely reported, and no remedy is required for the uplink data transmission; or if the actual decoding result is a NACK, and the predicted decoding result is an ACK, determining, by the DU, that the uplink data is missed to be reported, and the remedy needs to be performed for the uplink data transmission.

With reference to the first possible implementation of the second aspect, in a second possible implementation, after the determining, by the DU, that the uplink data is missed to be reported, and the remedy needs to be performed for the uplink data transmission, the method further includes: if a retransmission process of the terminal is suspended and a maximum quantity of retransmission times is not reached, scheduling the terminal to perform retransmission; or if first uplink data buffered at a physical layer of the terminal has been cleared, transmitting second uplink data, where the second uplink data includes retransmitted data of the first uplink data.

With reference to the second aspect, the first possible implementation of the second aspect, or the second possible implementation of the second aspect, in a third possible implementation, the method further includes: collecting a quantity of initially transmitted blocks N in a specified period; calculating, based on the predicted decoding result, a predicted quantity of error blocks $N_{pre}^{err}$ in initial transmission; obtaining through calculation, a predicted initial block error rate IBLER based on N and $N_{pre}^{err}$; calculating, based on the actual decoding result, an actual quantity of error blocks $N_{real}^{err}$ in the initial transmission; obtaining through calculation, an actual IBLER based on N and $N_{real}^{err}$; and adjusting a calibration deviation $SINR_{adj}$ of a signal to interference plus noise ratio SINR based on the predicted IBLER and the actual IBLER.

In this implementation, a prediction behavior of the RU may be calibrated based on the actual decoding result, to improve prediction accuracy of subsequent uplink transmission.

According to a third aspect, a data transmission method is provided, including: predicting, by a digital unit DU, a decoding result of downlink data transmission based on at least one piece of historical information; scheduling, by the DU, the downlink data transmission based on a predicted decoding result; receiving, by the DU, an actual decoding result from a terminal; and performing, by the DU, an error remedy for the downlink data transmission based on the predicted decoding result and the actual decoding result.

In this aspect, the decoding result of the downlink data transmission is predicted, and scheduling information for data transmission is adjusted based on the predicted decoding result, thereby improving data transmission reliability, so that a data transmission latency in a relaxed latency communication scenario can be met, data transmission can be normally performed, and an interface of a base station after a re-split can be normally used, thereby reducing a bandwidth requirement on the interface.

With reference to the third aspect, in a first possible implementation, the at least one piece of historical information includes: statistical information of an SINR, a modulation and coding scheme MCS, a resource block RB, doppler, and the predicted decoding result.

With reference to the third aspect or the first possible implementation of the third aspect, in a second possible implementation, the performing, by the DU, an error remedy for the downlink data transmission based on the predicted decoding result and the actual decoding result includes: if the actual decoding result is a positive acknowledgment ACK and the predicted decoding result is a negative acknowledgment NACK, determining, by the DU, that the predicted decoding result is falsely reported, and no remedy is required for the downlink data transmission; or if the actual decoding result is a NACK, and the predicted decoding result is an ACK, determining, by the DU, that the downlink data is missed to be reported, and the remedy needs to be performed for the downlink data transmission.

In this implementation, the DU performs the remedy for the downlink data transmission based on the actual decoding result and the predicted decoding result, to further improve the data transmission reliability.

With reference to the second possible implementation of the third aspect, in a third possible implementation, after the determining, by the DU, that the downlink data is missed to be reported, and the remedy needs to be performed for the downlink data transmission, the method further includes: if a retransmission process of the data is not occupied, retransmitting, by the DU, the data by using the retransmission process; or if a retransmission process of the data is occupied, scheduling, by the DU, a new process to initially transmit the data.

With reference to the third aspect, the first possible implementation of the third aspect, the second possible implementation of the third aspect, or the third possible implementation of the third aspect, in a fourth possible implementation, the method further includes: collecting a quantity of initially transmitted blocks N in a specified period; calculating, based on the predicted decoding result, a predicted quantity of error blocks $N_{pre}^{err}$ in initial transmission; obtaining through calculation, a predicted initial block error rate IBLER based on N and $N_{pre}^{err}$; calculating, based on the decoding result of the terminal, an actual quantity of error blocks $N_{pre}^{err}$ in the initial transmission; obtaining through calculation, an actual IBLER based on N and $N_{real}^{err}$; and adjusting a calibration deviation $SINR_{adj}$ of the signal to interference plus noise ratio SINR based on the predicted IBLER and the actual IBLER.

In this implementation, a prediction behavior of the DU may be calibrated based on the actual decoding result, to improve prediction accuracy of subsequent downlink transmission.

According to a fourth aspect, a data transmission apparatus is provided, and can implement the data transmission method in the first aspect. For example, the data transmission apparatus may be a chip or a radio unit. The apparatus may implement the foregoing method by using software or hardware, or by using hardware executing corresponding software.

In a possible implementation, a structure of the data transmission apparatus includes a processor and a memory; and the processor is configured to support the apparatus in performing a corresponding function in the foregoing communication method. The memory is configured to be coupled to the processor, and the memory stores a program (an instruction) and/or data that are/is necessary for the apparatus. Optionally, the data transmission apparatus may further include a communications interface, configured to support communication between the apparatus and another network element.

In another possible implementation, the data transmission apparatus may include a unit and a module that perform a corresponding action in the foregoing method.

In still another possible implementation, a processor and a transceiver apparatus are included. The processor is coupled to the transceiver apparatus. The processor is configured to execute a computer program or an instruction, to control the transceiver apparatus to send and receive information, and when the processor executes the computer program or the instruction, the processor is further configured to implement the foregoing method. The transceiver apparatus may be a transceiver, a transceiver circuit, or an input/output interface. When the data transmission apparatus is a chip, the transceiver apparatus is a transceiver circuit or an input/output interface.

When the data transmission apparatus is a chip, a sending unit may be an output unit, for example, an output circuit or a communications interface; and a receiving unit may be an input unit, for example, an input circuit or a communications interface. When the data transmission apparatus is a network device, a sending unit may be a transmitter or a transmitter, and a receiving unit may be a receiver or a receiver.

According to a fifth aspect, a data transmission apparatus is provided, and can implement the data transmission method in the second aspect or the third aspect. For example, the data transmission apparatus may be a chip or a digital unit, and may implement the foregoing method by using software or hardware, or by using hardware executing corresponding software.

In a possible implementation, a structure of the data transmission apparatus includes a processor and a memory; and the processor is configured to support the apparatus in performing a corresponding function in the foregoing communication method. The memory is configured to be coupled to the processor, and stores a program (an instruction) and data that are necessary for the apparatus. Optionally, the data transmission apparatus may further include a communications interface, configured to support communication between the apparatus and another network element.

In another possible implementation, the data transmission apparatus may include a unit and a module that perform a corresponding action in the foregoing method.

In still another possible implementation, a processor and a transceiver apparatus are included. The processor is coupled to the transceiver apparatus. The processor is configured to execute a computer program or an instruction, to control the transceiver apparatus to send and receive information, and when the processor executes the computer program or the instruction, the processor is further configured to implement the foregoing method. The transceiver apparatus may be a transceiver, a transceiver circuit, or an input/output interface. When the data transmission apparatus is a chip, the transceiver apparatus is a transceiver circuit or an input/output interface.

When the data transmission apparatus is a chip, a receiving unit may be an input unit, for example, an input circuit or a communications interface; and a sending unit may be an output unit, for example, an output circuit or a communications interface. When the data transmission apparatus is a terminal device, a receiving unit may be a receiver; and a sending unit may be a transmitter.

According to a sixth aspect, a computer-readable storage medium is provided, where the computer-readable storage medium stores a computer program or an instruction, and when the computer program or the instruction is executed, the method in the foregoing aspects is implemented.

According to a seventh aspect, a computer program product including an instruction is provided. When the instruction is run on a computer, the computer is enabled to perform the method in the foregoing aspects.

DESCRIPTION OF EMBODIMENTS

The following describes the technical solutions in the embodiments of this application with reference to the accompanying drawings in the embodiments of this application.

Figure 1:
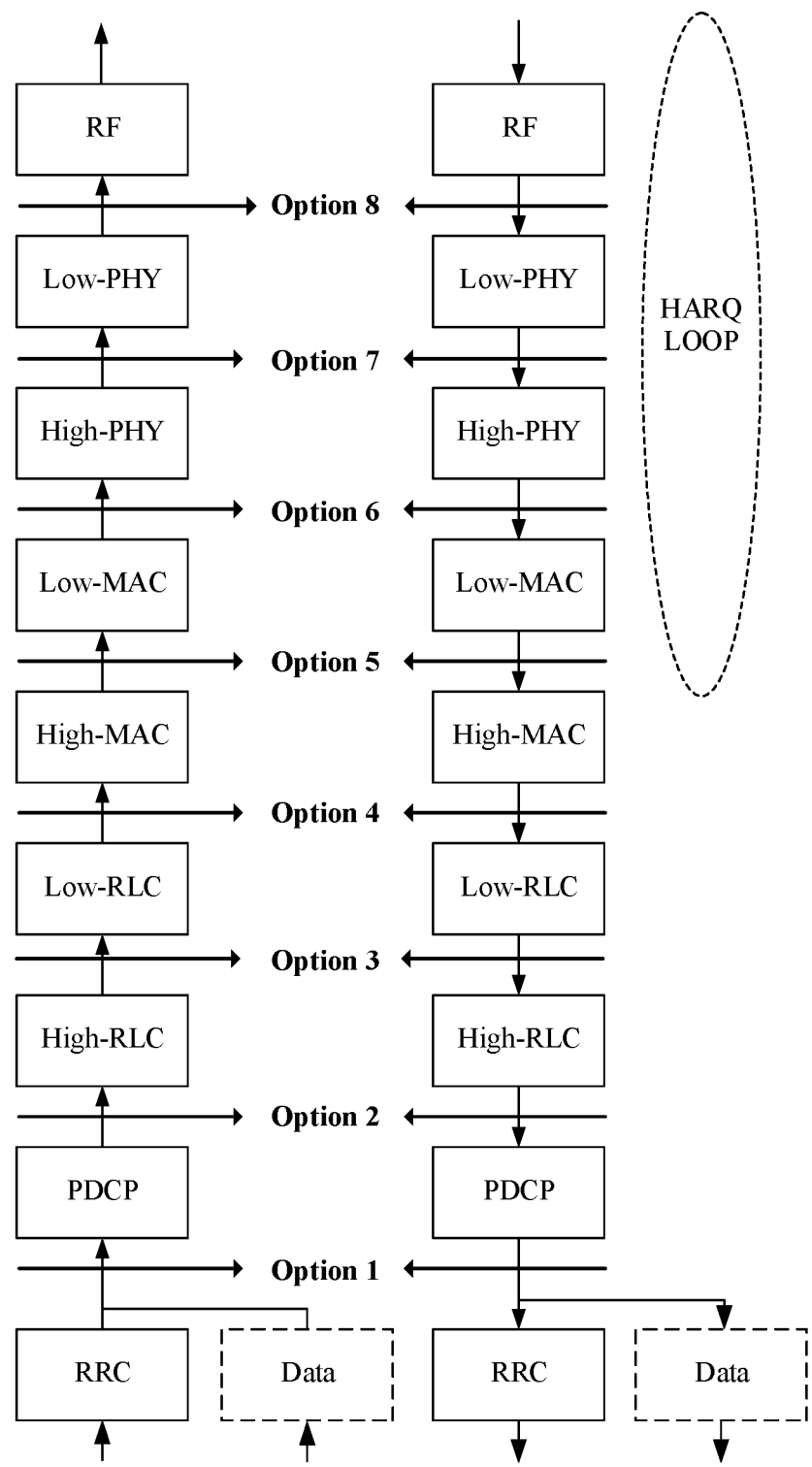
FIG. 1 is a schematic diagram of a re-split of an interface of a base station.
Figure 2:
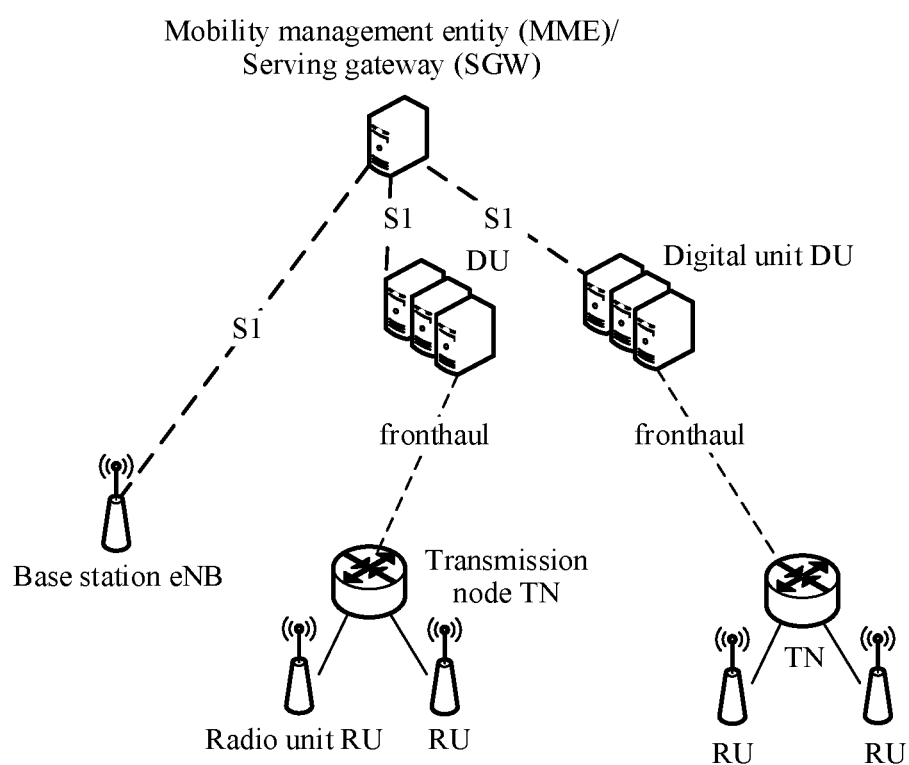
FIG. 2 is a schematic diagram of a communications system to which an embodiment of this application is applicable.

FIG. 2 is a schematic diagram of a communications system to which an embodiment of this application is applicable. The communications system may include one or more RUs and one or more DUs. The one or more RUs are connected to one DU through a transmission node (TN), and a network for connection between the RU and the DU is referred to as a fronthaul network. The one or more DUs are then connected to a core network through an Si interface. Some or all functions of a radio access network device may be integrated into the DU. Functions of the RU and DU vary because splitting points are different. A terminal and the RU are wirelessly connected. The RU can be co-deployed with the DU or be an independent antenna device. The radio access network device in FIG. 2 is a device deployed in a radio access network to provide a wireless communication function, and includes but is not limited to a base station (for example, a base transceiver station, (BTS), a NodeB (NB), or an evolved NodeB (eNB or eNodeB), a transmission node or a transmission reception point (TRP or TP) or a next generation nodeB (gNB) in an NR system, a base station or a network device in a future communications network, a relay node, an access point, a vehicle-mounted device, a wearable device, a wireless-fidelity (Wi-Fi) site, a wireless backhaul node, a small cell, a micro cell, or the like.

The terminal in FIG. 2 is a device having a wireless transceiver function. The terminal may be deployed on land, including an indoor device, an outdoor device, a handheld device, a wearable device, or a vehicle-mounted device, may be deployed on a water surface (for example, on a ship), or may be deployed in the air (for example, on an airplane, a balloon, or a satellite). The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. The terminal device may sometimes be referred to as user equipment (UE), a terminal, an access terminal device, a UE unit, a UE station, a mobile station, a mobile console, a remote terminal device, a mobile device, a UE terminal device, a terminal device, a wireless communications device, a UE agent, a UE apparatus, or the like. After the fronthaul network with a relaxed latency is used, a strict retransmission latency requirement cannot be met. As a result, a retransmission function cannot be implemented according to a protocol requirement, affecting the throughput. Therefore, a data transmission solution needs to be optimized for a relaxed latency-based scenario. Therefore, a data transmission method and apparatus are provided in the embodiments of this application. A decoding result of uplink data transmission is predicted, and scheduling information for data transmission is adjusted based on a predicted decoding result, thereby improving data transmission reliability, so that a data transmission latency in a relaxed latency communication scenario can be met, data transmission can be normally performed, and an interface of a base station after a re-split can be normally used, thereby reducing a bandwidth requirement on the interface.

It should be noted that the data transmission method and apparatus provided in the embodiments of this application may also be applicable to a backhaul transmission network with a relaxed latency (backhaul network for short), for example, an internet protocol radio access network (IP RAN).

A retransmission manner in this application may be specifically a HARQ, and certainly there may be another retransmission manner. In this application, the HARQ is used as an example for description. The following describes a HARQ transmission mechanism.

The HARQ is a technology that combines channel coding and an automatic repeat request technology. Channel coding can directly correct small-scale errors that occur during transmission. However, for a correction of a transmission error that exceeds an error correction capability of the channel coding, a receive end notifies a transmit end over a feedback link, to request to resend the message.

Figure 3:
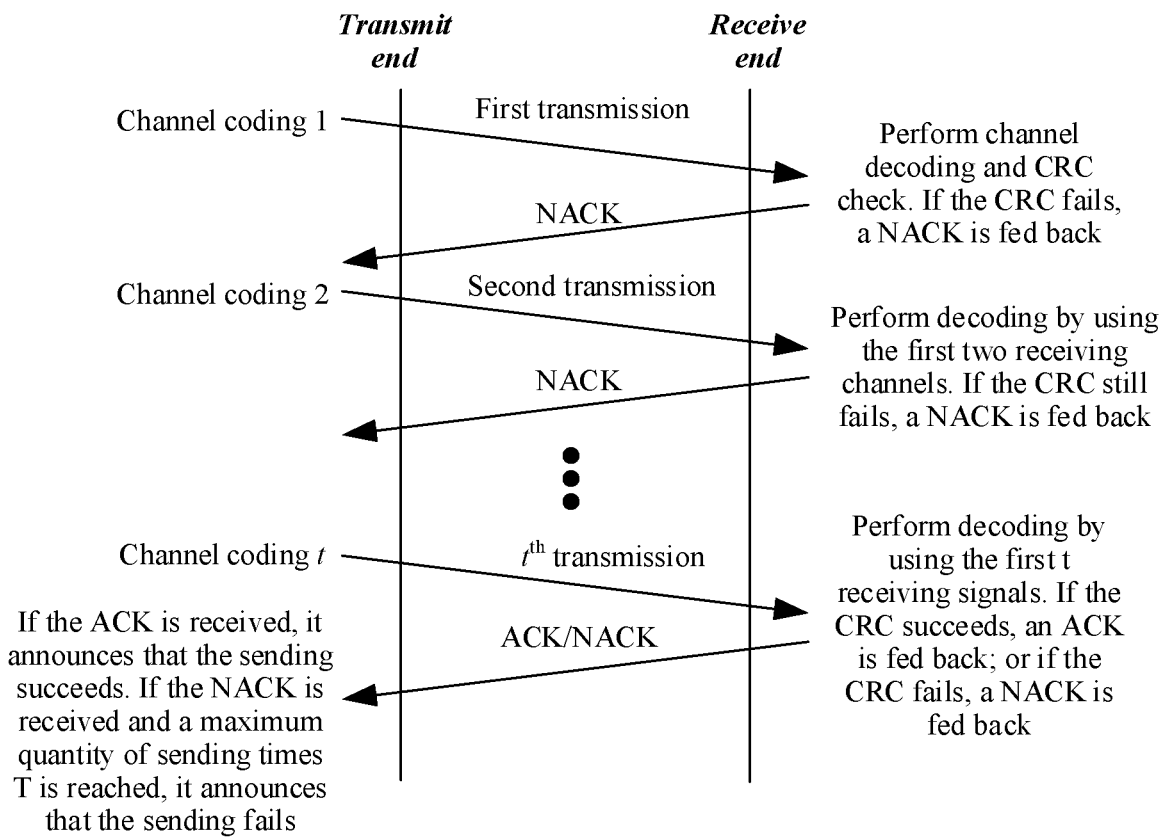
FIG. 3 is a schematic diagram of HARQ transmission.

In a schematic diagram of HARQ transmission shown in FIG. 3, a transmit end sends data to a receive end. If decoding at the receive end fails (for example, a cyclic redundancy check (CRC) fails), an error acknowledgment or a negative acknowledgment (NACK) is transmitted to the transmit end over a feedback link, and the transmit end sends new data. This process continues until the receive end sends a positive acknowledgment or an acknowledgment (ACK) to the transmit end to inform the transmit end that the decoding is correct. In this way, the transmission of an information block is completed. Specifically, as shown in FIG. 3, an incremental redundancy HARQ transmission manner may be used. The transmit end performs channel coding on to-be-sent data of a first redundancy version in a channel coding manner 1, and sends encoded data to the receive end for the first time; and the receive end performs channel decoding, and performs CRC check. If the CRC check fails, the receive end sends a NACK to the transmit end. Then, the transmit end performs channel coding on to-be-sent data of a second redundancy version in a channel coding manner 2, and sends encoded data to the receive end for the second time; and the receive end attempts to perform decoding by using first two receiving channels. If the CRC still fails, the transmit end feeds back a NACK to the receive end. By analogy, the transmit end performs channel coding on to-be-sent data of a $t^{th}$ redundancy version in a channel coding manner t, and sends encoded data to the receive end for the $t^{th}$ time; and the receive end attempts to perform decoding by using first t times of receiving channels. If the CRC succeeds, the transmit end feeds back an ACK to the receive end, indicating that the sending succeeds. On the contrary, if the CRC still fails, the transmit end feeds back a NACK to the receive end. If a quantity of times of sending the NACK has reached a maximum quantity T, the transmit end announces that the sending fails.

Based on a data transmission direction, HARQ is classified into uplink HARQ and downlink HARQ. In uplink HARQ, after receiving data, a base station determines whether to schedule a terminal to perform initial transmission or retransmission based on a cyclic redundancy check (CRC) status, and feeds back an ACK/NACK to the terminal through a physical hybrid automatic repeat request indicator channel (PHICH). In downlink HARQ, after receiving data from a base station, a terminal feeds back a CRC to the base station through a physical uplink control channel (PUCCH), and the base station determines, based on a CRC status, whether to send the retransmitted data to the terminal next time or send new transmitted data to the terminal next time.

Figure 4:
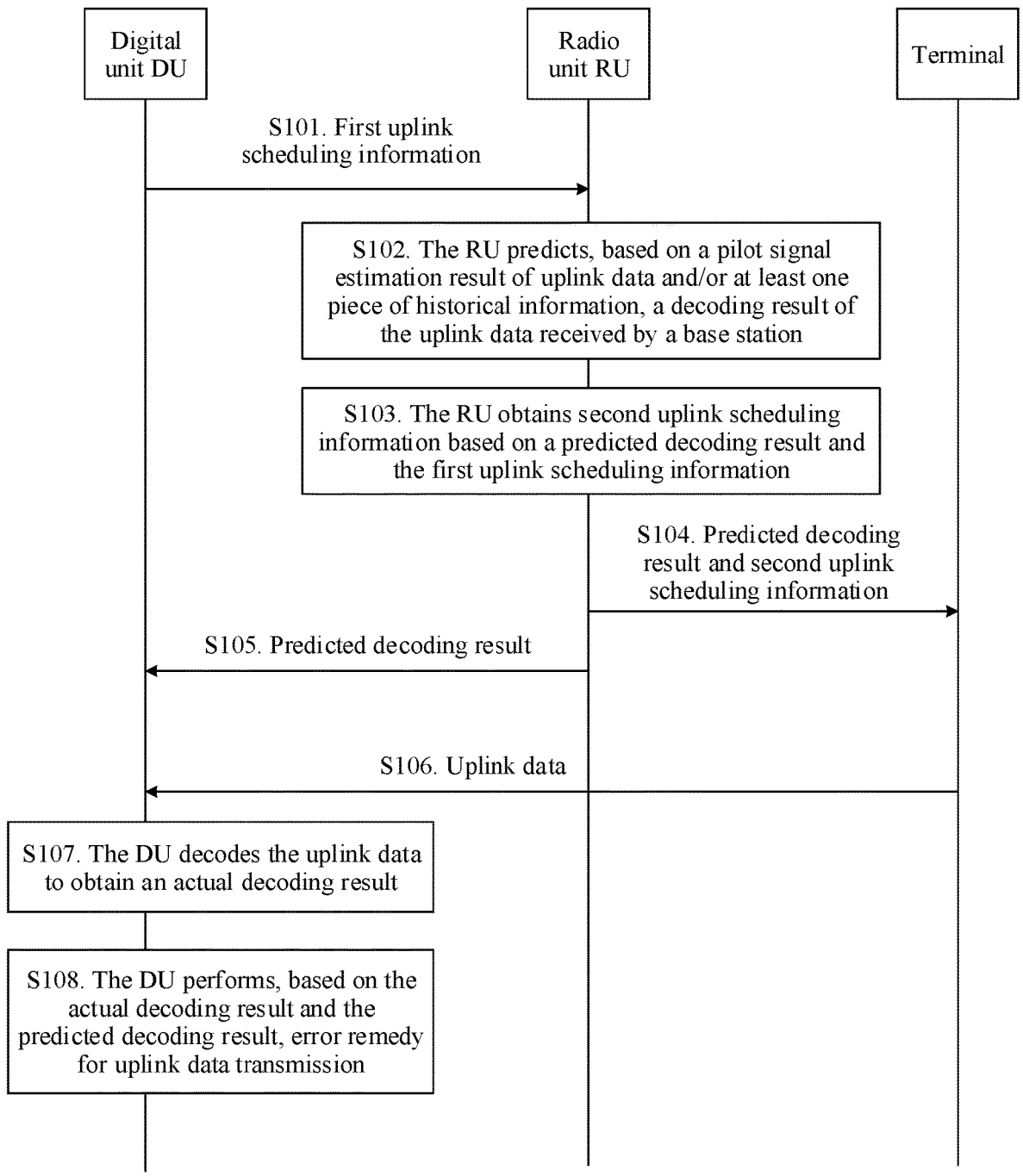
FIG. 4 is a schematic interaction flowchart of a data transmission method according to an embodiment of this application.

FIG. 4 is a schematic flowchart of a data transmission method according to an embodiment of this application. The method may include the following steps.

S101. A DU sends first uplink scheduling information to an RU.

The RU receives the first uplink scheduling information.

A base station schedules uplink data transmission of a terminal, and a DU end schedules the uplink data transmission based on a re-split technology of an interface of a base station, to generate the first uplink scheduling information. Specifically, the scheduling may be implemented by a MAC layer protocol stack module in the DU. The first uplink scheduling information includes information about whether each terminal performs initial transmission scheduling, and information indicating to allocate initial transmission resources to these terminals.

The DU schedules the terminal mainly based on whether retransmission information of the terminal is obtained. If the retransmission information of the terminal cannot be obtained due to a latency, the DU performs initial transmission scheduling. If the DU directly performs scheduling based on the generated first uplink scheduling information, the base station may not reliably receive data sent by the terminal, and retransmission is required. However, a retransmission latency cannot be met, consequently, a retransmission function cannot be implemented based on a protocol requirement, and a throughput is affected.

S102. The RU predicts, based on a pilot signal estimation result of uplink data and/or at least one piece of historical information, a decoding result of the uplink data received by the base station.

Because the RU may obtain, in a most timely manner, the data sent by the terminal, and the RU can obtain channel information in a most timely manner, in this embodiment, the RU predicts the decoding result of the uplink data received by the base station. The DU sends the first uplink scheduling information to the RU, and the RU temporarily stores the first uplink scheduling information.

In S102, the RU may predict, based on the pilot signal estimation result of the uplink data and/or the at least one piece of historical information, the decoding result of the uplink data received by the base station. The RU sends a pilot signal to the terminal to perform channel measurement, and then obtain the pilot signal estimation result of the uplink data sent by the terminal. In addition, the historical information includes at least one of the following information: statistical information of a modulation and coding scheme (MCS), a resource block (RB), doppler, and a predicted decoding result. Based on the information, the decoding result of the uplink data received by the base station can be relatively accurately predicted.

S103. The RU obtains second uplink scheduling information based on the predicted decoding result and the first uplink scheduling information.

After the RU receives the first uplink scheduling information sent by the DU and obtains, based on the pilot signal estimation result of the uplink data and/or the at least one piece of historical information, the predicted decoding result, S103 is performed. The RU determines, based on the predicted decoding result, whether the first uplink scheduling information needs to be modified, and finally obtains the second uplink scheduling information. The uplink scheduling information is adjusted in a timely manner based on the predicted decoding result, so that data transmission reliability can be improved, and a data transmission latency in a relaxed latency communication scenario can be met.

Specifically, S103 includes:

The RU determines that the second uplink scheduling information is the first uplink scheduling information if the predicted decoding result is an ACK; or modifies the first uplink scheduling information to obtain the second uplink scheduling information if the predicted decoding result is a NACK.

That is, if the predicted decoding result is the ACK, uplink data transmission may be successful within the transmission time interval (TTI). In this case, the first uplink scheduling information may not be adjusted, and the first uplink scheduling information is directly used as the final uplink scheduling information. If the predicted decoding result is the NACK, uplink data transmission may fail in the TTI. In this case, the first uplink scheduling information is modified to obtain the second uplink scheduling information, and the second uplink scheduling information is used as final uplink scheduling information.

Specifically, in an implementation, the modifying the first uplink scheduling information to obtain the second uplink scheduling information if the predicted decoding result is a NACK includes: if the predicted decoding result is the NACK, and the first uplink scheduling information includes scheduling information of the terminal, determining, by the RU, that the second uplink scheduling information is to schedule the terminal to perform retransmission by using an initial transmission scheduling resource.

In another implementation, the modifying the first uplink scheduling information to obtain the second uplink scheduling information if the predicted decoding result is a NACK includes: if the predicted decoding result is the NACK, and the first uplink scheduling information does not include scheduling information of the terminal, determining, by the RU based on whether a resource scheduled by the terminal in a previous retransmission transmission time interval TTI is occupied by another terminal in a current TTI, that the second uplink scheduling information is to schedule the terminal to perform non-adaptive retransmission or suspend a retransmission process of the terminal.

Descriptions are provided below in detail with reference to a specific example.

S104. The RU sends the predicted decoding result and the second uplink scheduling information to the terminal.

S105. The RU sends the predicted decoding result to the DU. The DU receives the predicted decoding result.

The RU sends the predicted decoding result to the terminal through a PHICH channel, and sends the second uplink scheduling information to the terminal. The RU also sends the predicted decoding result to the DU.

S106. The terminal sends the uplink data to the DU. The DU receives the uplink data.

The terminal sends the uplink data to the DU based on the received uplink scheduling information.

S107. The DU decodes the uplink data to obtain an actual decoding result.

After receiving the uplink data, the DU decodes the uplink data to obtain the actual decoding result.

S108. The DU performs an error remedy for the uplink data transmission based on the actual decoding result and the predicted decoding result.

The actual decoding result obtained by the DU may be consistent with or inconsistent with the received decoding result predicted by the RU, and the following processing is specifically performed based on a comparison result.

Specifically, S108 includes:

If the actual decoding result is the positive acknowledgment ACK and the predicted decoding result is the negative acknowledgment NACK, the DU determines that the predicted decoding result is falsely reported, and no remedy is required for the uplink data transmission; or if the actual decoding result is the NACK, and the predicted decoding result is the ACK, the DU determines that the uplink data is missed to be reported, and the remedy needs to be performed for the uplink data transmission.

That is, if the actual decoding result is the ACK, but the decoding result predicted by the RU is the NACK, it is determined that the prediction result of the RU is falsely reported. In this case, some resources are wasted, but no remedy is required. If the actual decoding result is the NACK, but the decoding result predicted by the RU is the ACK, the uplink data transmission may be remedied based on a specific situation. Descriptions are provided below in detail with reference to a specific example.

According to the technical solutions of this embodiment, the decoding result of the uplink data transmission is predicted, and scheduling information for data transmission is adjusted based on the predicted decoding result, thereby improving data transmission reliability, so that a data transmission latency in a relaxed latency communication scenario can be met, data transmission can be normally performed, and an interface of a base station after a re-split can be normally used, thereby reducing a bandwidth requirement on the interface.

HARQ transmission is used below as an example. The RU predicts a decoding result. The uplink HARQ is described in detail. It should be noted that for the downlink HARQ, the DU may also predict a decoding result.

Figure 5:
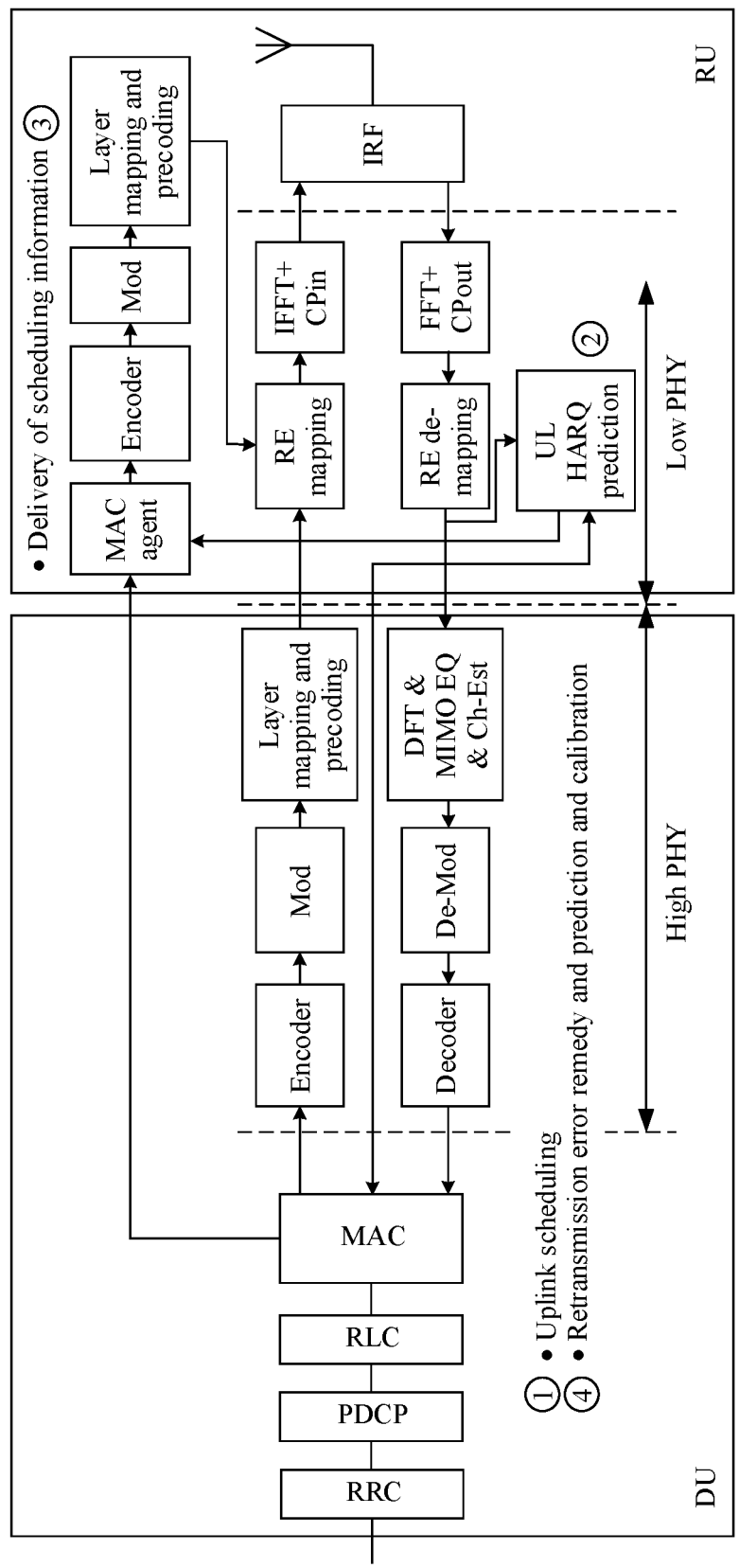
FIG. 5 is a schematic diagram of another data transmission method in a specific example.

FIG. 5 is a schematic diagram of another data transmission method in a specific example. In FIG. 5, division of an interface of a base station in option 7 is used as an example, that is, division is performed at a high-PHY protocol stack layer and a low-PHY protocol stack layer. In FIG. 5, there is no specific differentiation between a low MAC layer and a high MAC layer, and between a low radio link control (Low-RLC) layer and a high radio link control (High-RLC) layer. The low-MAC and the high-MAC are collectively referred to as a MAC, and the low-RLC and the high-RLC are collectively referred to as an RLC. After the interface is re-splitted, an interface between the RU and the DU is referred to as an eCPRI. In FIG. 5, functions of a media access control (MAC) layer protocol stack module are improved compared with those in the prior art. A media access control layer protocol stack agent (MAC agent), an encoder, a modulator (Mod), a layer mapping and precoding module, and an uplink HARQ prediction (UL HARQ prediction) module are newly added modules in this example, and other modules may be existing modules. Some functions of an encoder, a modem, and a layer mapping and precoding module in the RU are transferred from an encoder, a modem, and a layer mapping and precoding module in the DU. When the MAC agent receives second scheduling information, the encoder, the modem, and the layer mapping and precoding module in the RU each process the second scheduling information and then the second scheduling information is sent to the terminal.

Four steps are included in this example, which respectively correspond to 1234 in FIG. 5.

1. Uplink Scheduling

The base station schedules the terminal to perform uplink transmission. The uplink scheduling may be uplink transmission scheduling of one or more terminals. As shown in FIG. 5, a MAC layer protocol stack module of the DU implements a scheduling function.

During uplink scheduling, the MAC layer protocol stack module first determines whether a HARQ process of the terminal is suspended (A MAC layer does not receive a CRC result at a PHY layer, and an LTE protocol specifies an uplink synchronous HARQ. Therefore, the CRC result is unknown. As a result, it is unknown whether a current HARQ process indicates retransmission or initial transmission, and no new HARQ process can be used. Suspending is a common solution to this), and a maximum quantity of retransmissions is not reached. If a HARQ process is available, the terminal is scheduled to perform an adaptive retransmission. The uplink scheduling does not include uplink scheduling of the terminal whose HARQ process is suspended.

Another terminal cannot obtain retransmission information of the terminal due to a latency and therefore are scheduled as a terminal that needs to perform an initial transmission.

After the above operations are performed, uplink scheduling information is generated. The uplink scheduling information includes information about whether each terminal performs initial transmission scheduling.

An uplink scheduling result is sent to a MAC agent of the RU. A main function of the MAC agent is to temporarily store the scheduling result and determine the final scheduling result based on the HARQ prediction result. The module implements some scheduling functions of the MAC layer protocol stack module on the RU, so that the module is referred to as the MAC agent.

2. Uplink HARQ Prediction

To meet a strict latency constraint of a HARQ function, a decoding result of the uplink transmission is predicted in this embodiment. To ensure that a predicted decoding result is as accurate as possible, because the RU obtains channel information in a most timely manner, and the predicted decoding result is the most accurate, the RU may predict the decoding result of the uplink transmission. The decoding result includes a CRC result and the like.

After receiving data on a physical uplink shared channel (PUSCH) from the terminal, an uplink HARQ prediction module of the RU performs HARQ prediction based on a pilot symbol channel estimation result of uplink data and at least one piece of historical information (including a signal to interference plus noise ratio (SINR), a modulation and coding scheme (MCS), a resource block (RB), doppler, an actual CRC result, and the like). There are many specific methods for HARQ prediction. Examples are described below.

EXAMPLE 1

HARQ prediction is performed based on a SINR-BLER mapping table (which an MCS order has a relationship with a SINR-BLER curve)

Specifically, step S102 includes:

The RU estimates a signal to interference plus noise ratio based on the pilot signal estimation result of the uplink data;

the RU calibrates, based on the SINR obtained by estimation and a calibration deviation $SINR_{adj}$ of the SINR, the SINR obtained by estimation;

the RU obtains a block error rate BLER based on the at least one piece of historical information, a calibrated SINR, and a mapping relationship between an SINR and a BLER; and the RU generates the predicted decoding result based on the obtained BLER.

Figure 6:
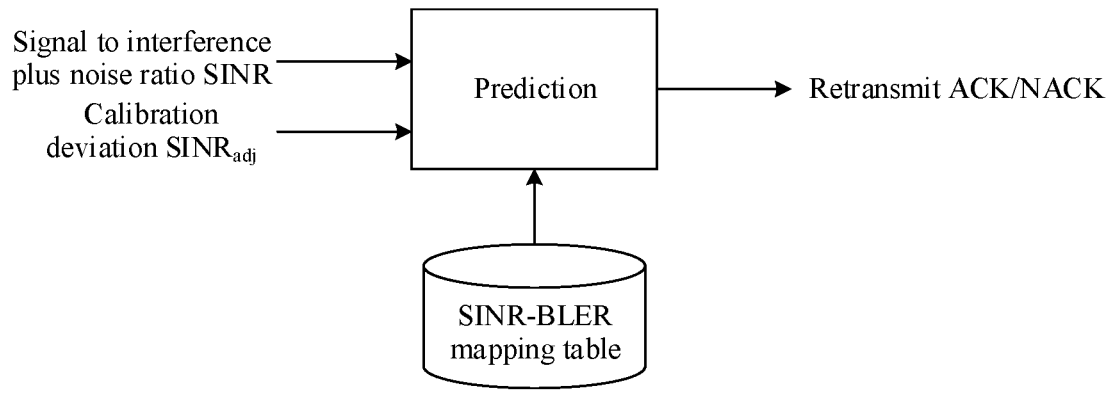
FIG. 6 is a schematic diagram of estimating a block error rate based on an SINR estimation value, an SINR calibration deviation, and an SINR-BLER mapping table.

During specific implementation, the RU estimates the signal to interference plus noise ratio (SINR) based on the pilot signal estimation result of the uplink data. An error may exist in the estimated SINR, and further, the estimated SINR is calibrated. FIG. 6 is a schematic diagram of estimating a block error rate (BLER) based on an SINR estimation value, an SINR calibration deviation, and an SINR-BLER mapping table. It is assumed that the calibration deviation of the SINR is $SINR_{adj}$, when the estimated SINR value and the $SINR_{adj}$ are input, the calibrated SINR can be obtained according to an algorithm, then the BLER corresponding to the calibrated SINR can be obtained based on the SINR-BLER mapping table. Finally, the predicted decoding result (where the predicted decoding result includes an ACK and a NACK) is generated based on the BLER. The predicted decoding result is carried on a PHICH and sent to the terminal. In addition, the predicted decoding result is transmitted to the DU.

The SINR-BLER mapping table is used as prior information, and may be obtained through simulation, or may be obtained through offline or online learning. The SINR-BLER mapping table may be stored in the RU.

EXAMPLE 2

Machine Learning Classifier

Features (such as an SINR, an RB, and doppler) are extracted and an ACK/NACK is predicted through machine learning (such as linear regression, a support vector machine, and a neural network).

3

Delivery of Scheduling Information

In this step, the MAC agent of the RU determines, based on the predicted decoding result and the stored scheduling information, how to deliver the scheduling information.

Details are separately described in the following table, as shown in Table 1.

TABLE 1

Relationship between a predicted decoding result and to-be-delivered scheduling information

| Scheduling or not | Predicted decoding result | |
| --- | --- | --- |
| | ACK | NACK |
| Yes | No special processing is required. The scheduling information is delivered normally. | The scheduling information is modified, and retransmission is performed by using an initial transmission scheduling resource. |
| No | No special processing is required. The scheduling information is delivered normally. | If another terminal is not scheduled on the corresponding initial transmission resource, the NACK is fed back, and non-adaptive retransmission is performed. If another terminal is scheduled on the corresponding initial transmission resource, the ACK is fed back, and the terminal suspends a corresponding HARQ process according to a protocol. |

As shown in Table 1, scheduling in "scheduling or not" in Table 1 refers to initial transmission scheduling determined by the MAC layer protocol stack module, and does not include adaptive retransmission scheduling, and specifically means whether initial transmission scheduling is performed for a related terminal.

If the predicted decoding result is the ACK, regardless of whether the scheduling information sent by the MAC layer protocol stack module to the MAC agent includes scheduling information of a terminal, the MAC agent does not need to perform special processing (for example, modifying the scheduling information) on the scheduling information delivered by the MAC layer protocol stack, but directly delivers, to the terminal, uplink scheduling information transmitted by the MAC layer protocol stack module to the MAC agent. If the predicted decoding result is the NACK, the MAC agent may need to modify the scheduling information because all the scheduling information is scheduled based on that the scheduling information is initially transmitted.

Specifically, if the scheduling information sent by the MAC layer protocol stack module to the MAC agent includes scheduling information of a terminal (which specifically includes that initial transmission scheduling is performed for the terminal), and the HARQ prediction result is the NACK, the scheduling information is modified to perform data retransmission in a previous TTI by using an initial transmission scheduling resource.

If the scheduling information sent by the MAC layer protocol stack module to the MAC agent does not include scheduling information of a terminal (which specifically does not include that initial transmission scheduling is not performed for the terminal), and the predicted decoding result is the NACK, when no other terminal is scheduled on the corresponding initial transmission resource, the NACK is fed back and non-adaptive retransmission is performed. If another terminal is scheduled on the corresponding initial transmission resource, the ACK is fed back, and the terminal suspends the corresponding HARQ process according to the protocol.

4

HARQ Error Remedy and Prediction and Calibration (Compensation/Predict Error Correct)

After receiving the data sent by the terminal, the base station decodes the received data, to obtain an actual decoding result. In addition, the base station determines whether a prediction error occurs based on the actual decoding result and the received predicted decoding result. Specifically, the prediction error further includes two types of errors:

False report: If the actual decoding result is an ACK, but the decoding result predicted by the RU is a NACK, it is determined that the prediction result of the RU is falsely reported. In this case, some resources are wasted, but no remedy is required.

Missing report: If the actual decoding result is a NACK, but the decoding result predicted by the RU is an ACK, there are two corresponding cases:

If the HARQ process is suspended and a maximum quantity of retransmissions is not reached, a retransmission can be proactively scheduled for remedy.

If first uplink data in a buffer (specifically, a buffer at a physical layer of the terminal) of the terminal is cleared, in other words, if a HARQ function cannot be used, only upper-layer retransmission (for example, an ARQ of an RLC of the terminal) can be used for remedy, to transmit second uplink data, where the second uplink data includes retransmitted data of the first uplink data.

In addition, the HARQ prediction solution may be designed based on differentiated requirements of a false report probability and a missing report probability.

After the MAC agent delivers the scheduling information, the base station receives the data transmitted by the terminal, and obtains the actual decoding result. Then, a prediction behavior of the RU may be calibrated based on the actual decoding result, to improve prediction accuracy of subsequent uplink transmission.

Specifically, the MAC layer protocol stack module calibrates the estimated SINR value in the prediction based on the following information, and outputs the estimated SINR value to an uplink HARQ prediction module of the RU.

Predicted initial block error rate (initial BLER, IBLER) is expressed as $IBLER_{pre}$. The IBLER is calculated based on the ACK/NACK predicted by the CRC. The method is as follows: A quantity of blocks N initially transmitted in a period of time are collected, and a predicted quantity of error blocks in initial transmission (that is, a quantity of possible error blocks in initial transmission through the CRC prediction after the base station receives the uplink data) is $N_{pre}^{err}$. Then:

$$IBLER_{pre} = \frac{N_{pre}^{err}}{N}$$

b) Measured IBLER is expressed as $IBLER_{real}$. The measured IBLER is calculated based on the actual decoded ACK/NACK. The method is as follows: A quantity of blocks N initially transmitted in a period of time are collected, and a quantity of decoded error blocks in the initial transmission is $N_{real}^{err}$. Then:

$$IBLER_{real} = \frac{N_{real}^{err}}{N}$$

The calibration deviation $SINR_{adj}$ of the SINR is calculated as follows:
$SINR_{adj} = SINR_{step} \cdot (IBLER_{pre} - IBLER_{real})$, where $SINR_{step}$ is an SINR adjustment step.

Figure 7:
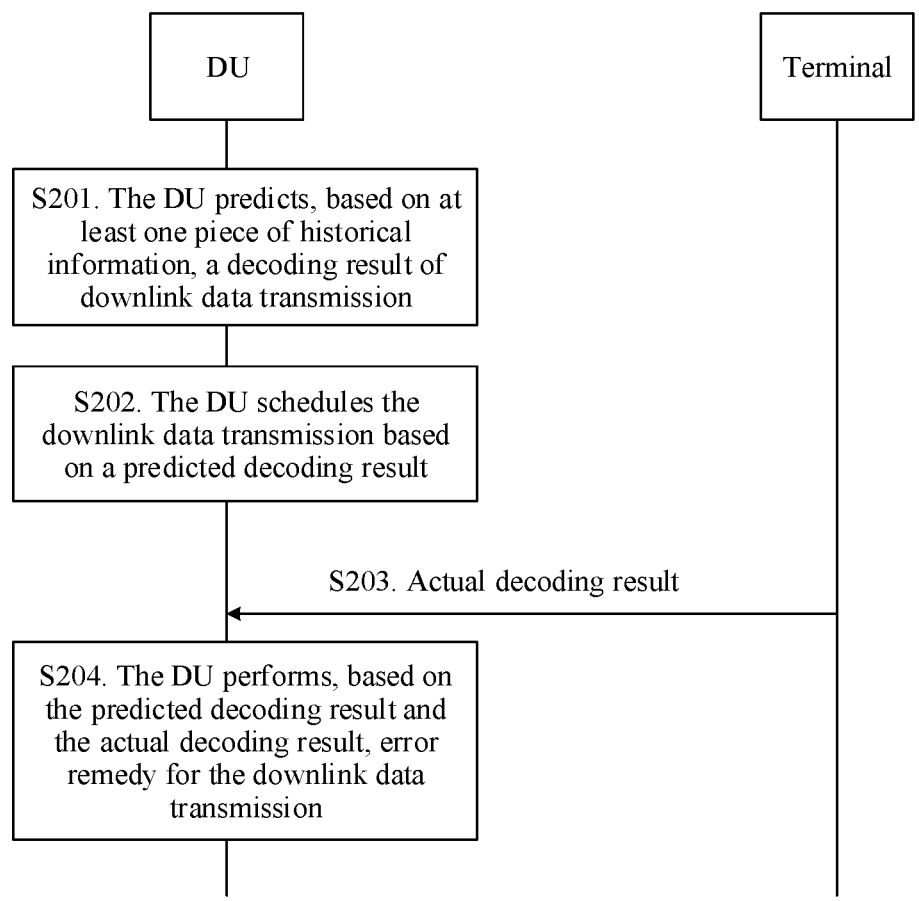
FIG. 7 is a schematic interaction flowchart of still another data transmission method according to an embodiment of this application.

FIG. 7 is a schematic interaction flowchart of still another data transmission method according to an embodiment of this application. The method may include the following steps.

S201. A DU predicts a decoding result of downlink data transmission based on at least one piece of historical information.

A base station transmits data to a terminal. To improve accuracy of downlink data transmission, in this embodiment, before the downlink data transmission is performed, the decoding result of the downlink data transmission is predicted. However, because the downlink data is received by the terminal, the decoding result of the downlink transmission cannot be predicted based on the received data. Therefore, the DU may predict the decoding result of the downlink data transmission.

Specifically, in S201, the DU predicts the decoding result of the downlink data transmission based on the at least one piece of historical information. The at least one piece of historical information includes: statistical information of an SINR, an MCS, an RB, doppler, and a predicted decoding result. For a specific prediction method, refer to the foregoing embodiment. It should be noted that, different from a predicted decoding result of uplink data transmission, because the decoding result of the downlink data transmission cannot be predicted based on the received data, the decoding result of downlink data transmission cannot be predicted based on a pilot symbol channel estimation result of uplink data either.

S202. The DU schedules the downlink data transmission based on the predicted decoding result.

During downlink scheduling, no feedback is received from the terminal in a corresponding downlink data transmission process. Therefore, scheduling is performed based on the predicted decoding result.

S203. The DU receives an actual decoding result from the terminal.

After receiving the downlink data, the terminal feeds back an actual decoding result. The DU receives the actual decoding result.

S204. The DU performs an error remedy for the downlink data transmission based on the predicted decoding result and the actual decoding result.

The decoding result predicted by the DU may be consistent with or inconsistent with the received actual decoding result, and the following processing is specifically performed based on a comparison result.

Specifically, S204 includes:

If the actual decoding result is an ACK and the predicted decoding result is a NACK, the DU determines that the predicted decoding result is falsely reported, and no remedy is required for the downlink data transmission; or if the actual decoding result is a NACK, and the predicted decoding result is an ACK, the DU determines that the downlink data is missed to be reported, and the remedy needs to be performed for the downlink data transmission.

That is, if the received actual decoding result is the ACK, but the decoding result predicted by the DU is the NACK, it is determined that the prediction result is falsely reported. In this case, some resources are wasted, but no remedy is required. If the received actual decoding result is the NACK, but the decoding result predicted by the DU is the ACK, the downlink data transmission may be remedied based on a specific situation. Descriptions are provided below in detail with reference to a specific example.

According to the technical solutions of this embodiment, the decoding result of the downlink data transmission is predicted, and scheduling information for data transmission is adjusted based on the predicted decoding result, thereby improving data transmission reliability, so that a data transmission latency in a relaxed latency communication scenario can be met, data transmission can be normally performed, and an interface of a base station after a re-split can be normally used, thereby reducing a bandwidth requirement on the interface.

Figure 8:
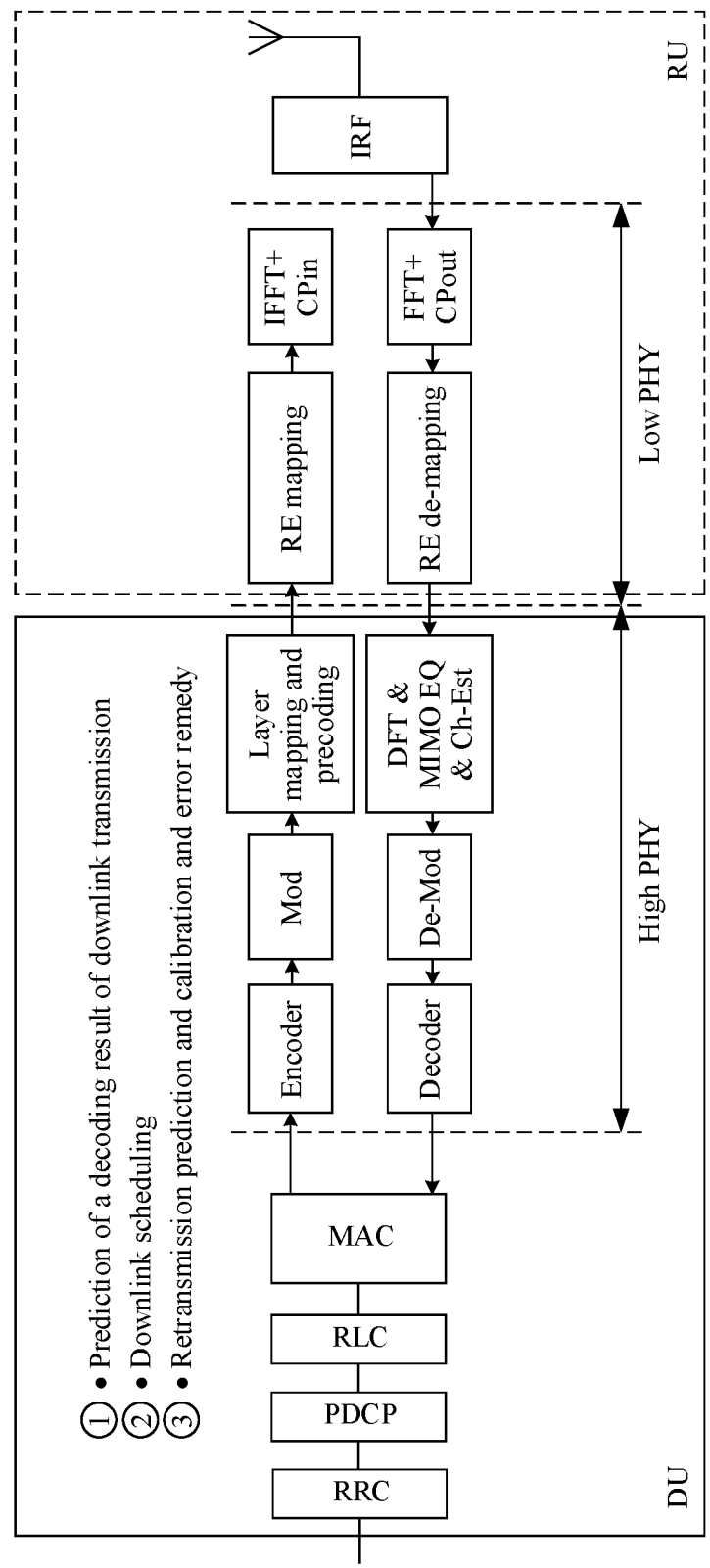
FIG. 8 is a schematic diagram of yet another data transmission method in a specific example.

The downlink data transmission is described below by using a downlink HARQ as an example. FIG. 8 is a schematic diagram of yet another data transmission method in a specific example. Three steps that respectively correspond to 123 in FIG. 8 are included in the downlink HARQ. The three steps are all implemented by a MAC layer protocol stack module in the DU.

1. Prediction of a Decoding Result of Downlink Transmission

In this example, the MAC layer protocol stack module of the DU performs HARQ prediction. Specifically, a CRC of a current HARQ process is predicted based on historical information (including an SINR, an MCS, an RB, doppler, an actual CRC result, and the like). For a specific implementation method for prediction, refer to the description in the example in FIG. 6. It should be noted that, different from uplink HARQ prediction, because downlink HARQ cannot be predicted based on the received data, the downlink HARQ cannot be predicted based on a pilot symbol channel estimation result of uplink data.

2. Downlink Scheduling

During downlink scheduling, because a fronthaul network with a relaxed latency is used in this application, and no HARQ feedback from the terminal is received in a corresponding HARQ process, scheduling is performed based on a predicted decoding result.

3. HARQ Prediction and Calibration and Error Remedy

When the HARQ prediction is incorrect, there are two types of errors:

False report: If the actual feedback result by the terminal is an ACK, but the result predicted by the DU is a NACK, some resources are wasted, but no remedy is required.

Missing report: If the actual feedback result is a NACK, but the decoding result predicted by the DU is an ACK, there are two corresponding cases:

If no other new data is scheduled in the corresponding HARQ process after the previous scheduling (that is, the HARQ process of the data is not occupied), the current HARQ process is used for retransmitting the data.

If other new data is scheduled in the corresponding HARQ process after the previous scheduling (that is, the HARQ process of the data is occupied), an indication indicating to newly transmit the data needs to be sent again, and the data to be retransmitted is included in the newly transmitted data (that is, the DU schedules a new process to initially transmit the data, where the data includes the retransmitted data). After receiving the retransmitted data, the terminal regards it as a new transmission and does not perform HARQ combination.

The MAC layer protocol stack module further calibrates the estimated SINR value in the prediction based on a quantity of initially transmitted blocks in a period of time, a predicted quantity of error blocks in initial transmission, the decoding result of the terminal, and the like. Specifically, the method may further include:

collecting a quantity of initially transmitted blocks N in a specified period;

calculating, based on the predicted decoding result, a predicted quantity of error blocks $N_{pre}^{err}$ in initial transmission;

obtaining through calculation, a predicted initial block error rate IBLER based on N and $N_{pre}^{err}$;

calculating, based on the decoding result of the terminal, an actual quantity of error blocks $N_{real}^{err}$ in the initial transmission;

obtaining through calculation, an actual IBLER based on N and $N_{real}^{err}$; and adjusting a calibration deviation $SINR_{adj}$ of a signal to interference plus noise ratio SINR based on the predicted IBLER and the actual IBLER.

For a specific implementation process, refer to the description in the foregoing embodiment.

The foregoing describes in detail the method in the embodiments of the present invention, and the following provides an apparatus in the embodiments of the present invention.

Figure 9:
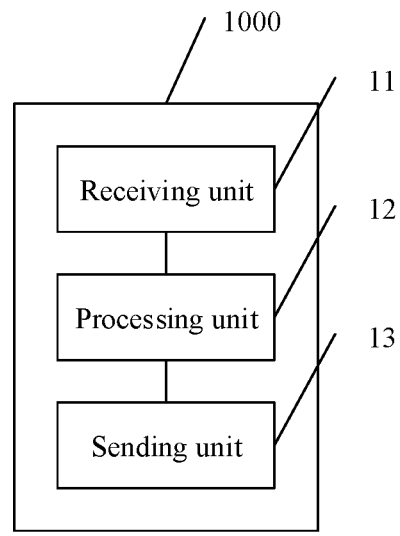
FIG. 9 is a schematic structural diagram of a data transmission apparatus according to an embodiment of this application.

Based on a same concept as the data transmission method in the foregoing embodiment, as shown in FIG. 9, an embodiment of this application further provides a data transmission apparatus 1000. The data transmission apparatus may be applied to the data transmission method shown in FIG. 4. The data transmission apparatus 1000 may be the radio unit shown in FIG. 2, or may be a component (for example, a chip) applied to the radio unit. The data transmission apparatus 1000 includes a receiving unit 11, a processing unit 12, and a sending unit 13, where the receiving unit 11 is configured to receive first uplink scheduling information sent by a digital unit DU;

the processing unit 12 is configured to predict, based on a pilot signal estimation result of uplink data and/or at least one piece of historical information, a decoding result of the uplink data received by a base station;

the processing unit 12 is further configured to obtain second uplink scheduling information based on a predicted decoding result and the first uplink scheduling information;

the sending unit 13 is configured to send the predicted decoding result and the second uplink scheduling information to a terminal; and the sending unit 13 is further configured to send the predicted decoding result to the DU.

In an implementation, the processing unit 12 is configured to: estimate a signal to interference plus noise ratio SINR based on the pilot signal estimation result of the uplink data; calibrate, by the RU based on the SINR obtained by estimation and a calibration deviation $SINR_{adj}$ of the SINR, the SINR obtained by estimation; obtain a block error rate BLER based on the at least one piece of historical information, a calibrated SINR, and a mapping relationship between an SINR and a BLER; and generate the predicted decoding result based on the obtained BLER.

In another implementation, the historical information includes at least one of the following information: statistical information of a modulation and coding scheme MCS, a resource block RB, doppler, and the predicted decoding result.

In still another implementation, the processing unit is configured to: determine that the second uplink scheduling information is the first uplink scheduling information if the predicted decoding result is an ACK; or modify the first uplink scheduling information to obtain the second uplink scheduling information if the predicted decoding result is a NACK.

In yet another implementation, the processing unit is configured to: if the predicted decoding result is the NACK, and the first uplink scheduling information includes scheduling information for initial transmission of the terminal in a previous transmission time interval TTI, determine that the second uplink scheduling information is to schedule the terminal to perform retransmission by using an initial transmission scheduling resource; or if the predicted decoding result is the NACK, and the first uplink scheduling information does not include scheduling information for initial transmission of the terminal in a previous TTI, determine, based on a scheduling status of an initial transmission scheduling resource of the terminal, that the second uplink scheduling information is to schedule the terminal to perform non-adaptive retransmission or suspend a retransmission process of the terminal.

For more detailed descriptions of the receiving unit 11, the processing unit 12, and the sending unit 13, refer to the related descriptions of the radio unit in the method embodiment shown in FIG. 4. Details are not described herein again.

Figure 10:
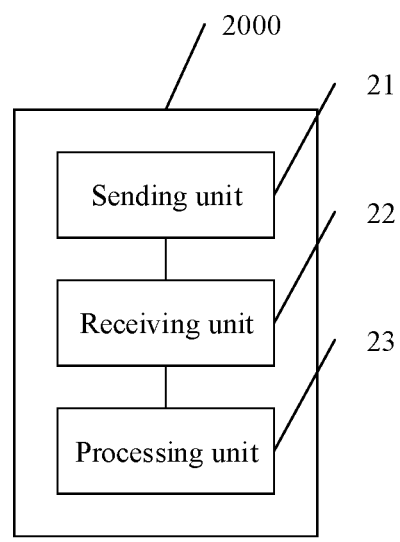
FIG. 10 is a schematic structural diagram of another data transmission apparatus according to an embodiment of this application.

Based on a same concept as the data transmission method in the foregoing embodiment, as shown in FIG. 10, an embodiment of this application further provides a data transmission apparatus 2000. The data transmission apparatus may be applied to the data transmission method shown in FIG. 4. The data transmission apparatus 2000 may be the digital unit shown in FIG. 2, or may be a component (for example, a chip) applied to the digital unit. The data transmission apparatus 2000 includes a sending unit 21, a receiving unit 22, and a processing unit 23, where the sending unit 21 is configured to send first uplink scheduling information to a radio unit RU;

the receiving unit 22 is configured to receive a predicted decoding result sent by the RU;

the receiving unit 22 is further configured to: receive uplink data sent by a terminal, and decode the uplink data to obtain an actual decoding result; and the processing unit 23 is configured to perform an error remedy for uplink data transmission based on the actual decoding result and the predicted decoding result.

In an implementation, the processing unit 23 is configured to: if the actual decoding result is a positive acknowledgment ACK and the predicted decoding result is a negative acknowledgment NACK, determine that the predicted decoding result is falsely reported, and no remedy is required for the uplink data transmission; or if the actual decoding result is a NACK, and the predicted decoding result is an ACK, determine that the uplink data is missed to be reported, and the remedy needs to be performed for the uplink data transmission.

In another implementation, the processing unit 23 is further configured to: if a retransmission process of the terminal is suspended and a maximum quantity of retransmissions is not reached, schedule the terminal to perform retransmission; or if first uplink data buffered at a physical layer of the terminal has been cleared, transmit second uplink data, where the second uplink data includes retransmitted data of the first uplink data.

In yet another implementation, the processing unit 23 is further configured to: collect a quantity of initially transmitted blocks N in a specified period; calculate, based on the predicted decoding result, a predicted quantity of error blocks $N_{pre}^{err}$ in initial transmission; obtain through calculation, a predicted initial block error rate IBLER based on N and $N_{pre}^{err}$; calculate, based on the actual decoding result, an actual quantity of error blocks $N_{real}^{err}$ in the initial transmission; obtain through calculation, an actual IBLER based on N and $N_{real}^{err}$; and adjust a calibration deviation $SINR_{adj}$ of a signal to interference plus noise ratio SINR based on the predicted IBLER and the actual IBLER.

For more detailed descriptions of the sending unit 21, the receiving unit 22, and the processing unit 23, refer to the related descriptions of the radio unit in the method embodiment shown in FIG. 4. Details are not described herein again.

Figure 11:
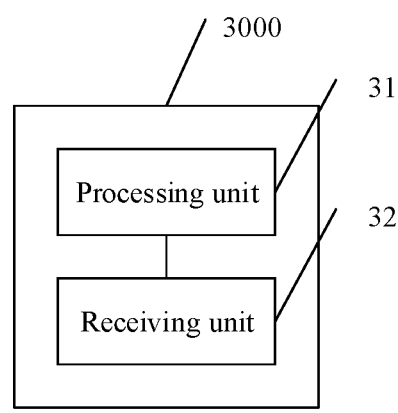
FIG. 11 is a schematic structural diagram of still another data transmission apparatus according to an embodiment of this application.

Based on a same concept as the data transmission method in the foregoing embodiment, as shown in FIG. 11, an embodiment of this application further provides a data transmission apparatus 3000. The data transmission apparatus may be applied to the data transmission method shown in FIG. 7. The data transmission apparatus 3000 may be the digital unit shown in FIG. 2, or may be a component (for example, a chip) applied to the digital unit. The data transmission apparatus 3000 includes a processing unit 31 and a receiving unit 32, where the processing unit 31 is configured to predict a decoding result of downlink data transmission based on at least one piece of historical information;

the processing unit 31 is further configured to schedule the downlink data transmission based on a predicted decoding result;

the receiving unit 32 is configured to receive an actual decoding result sent by a terminal; and the processing unit 31 is further configured to perform an error remedy for the downlink data transmission based on the predicted decoding result and the actual decoding result.

In an implementation, the historical information includes at least one of the following information: statistical information of an SINR, a modulation and coding scheme MCS, a resource block RB, doppler, and the predicted decoding result.

In another implementation, the processing unit is configured to: if the actual decoding result is a positive acknowledgment ACK and the predicted decoding result is a negative acknowledgment NACK, determine that the predicted decoding result is falsely reported, and no remedy is required for the downlink data transmission; or if the actual decoding result is a NACK, and the predicted decoding result is an ACK, determine that the downlink data is missed to be reported, and the remedy needs to be performed for the downlink data transmission.

In still another implementation, the processing unit is configured to: if a retransmission process of the data is not occupied, retransmit the data by using the retransmission process; or if a retransmission process of the data is occupied, schedule a new process to initially transmit the data.

In yet another implementation, the processing unit is further configured to: collect a quantity of initially transmitted blocks N in a specified period; calculate, based on the predicted decoding result, a predicted quantity of error blocks $N_{pre}^{err}$ in initial transmission; obtain through calculation, a predicted initial block error rate IBLER based on N and $N_{pre}^{err}$; calculate, based on the decoding result of the terminal, an actual quantity of error blocks $N_{real}^{err}$ in the initial transmission; obtain through calculation, an actual IBLER based on N and $N_{real}^{err}$; and adjust a calibration deviation $SINR_{adj}$ of the signal to interference plus noise ratio SINR based on the predicted IBLER and the actual IBLER.

For more detailed descriptions of the processing unit 31 and the receiving unit 32, refer to the related descriptions of the radio unit in the method embodiment shown in FIG. 7. Details are not described herein again.

An embodiment of this application further provides a data transmission device. The data transmission device is configured to perform the foregoing data transmission method. Some or all of the foregoing data transmission method may be implemented by using hardware or software.

Optionally, the data transmission device may be a chip or an integrated circuit during specific implementation.

Figure 12:
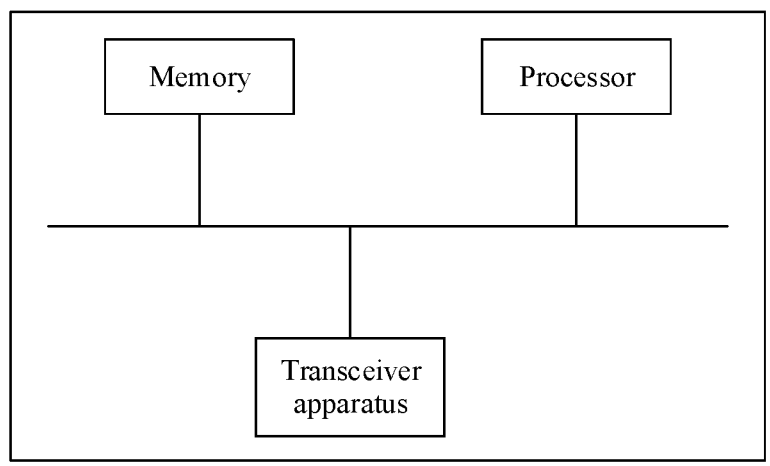
FIG. 12 is a schematic structural diagram of a data transmission device according to an embodiment of this application.

Optionally, when some or all of the data transmission method in the foregoing embodiments is implemented by using software, FIG. 12 is a schematic structural diagram of a data transmission device according to an embodiment of this application. The data transmission device includes a memory, configured to store a program; a processor, configured to execute the program stored in the memory, so that when the program is executed, the data transmission device can implement the data transmission method according to the foregoing embodiment; and a transceiver apparatus, configured to communicate with an external apparatus or device.

Optionally, the memory may be a physically independent unit, or may be integrated with the processor.

Optionally, when some or all of the data transmission method in the foregoing embodiments is implemented by using software, the data transmission device may alternatively include only a processor. A memory configured to store a program is located outside the data transmission device, and the processor is connected to the memory by using a circuit/wire and is configured to read and execute the program stored in the memory.

Optionally, the transceiver apparatus may be an integrated transceiver, or may include an independent transmitter and receiver.

The processor may be a central processing unit (CPU), a network processor (NP), or a combination of a CPU and an NP.

The processor may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory may include a volatile memory, for example, a random access memory (RAM); or the memory may include a non-volatile memory, for example, a flash memory, a hard disk (HDD), or a solid-state drive (SSD); or the memory may include a combination of the foregoing types of memories.

In an embodiment, the data transmission device may be the radio unit in the embodiment shown in FIG. 4.

Specifically, the transceiver apparatus is configured to perform steps S101, S104, and S105 in the embodiment shown in FIG. 4; and the processor is configured to perform steps S102 and S103 in the embodiment shown in FIG. 4.

In another embodiment, the data transmission device may be the digital unit in the embodiment shown in FIG. 4.

Specifically, the transceiver apparatus is configured to perform steps S101, S105, and S106 in the embodiment shown in FIG. 4; and the processor is configured to perform steps S107 and S108 in the embodiment shown in FIG. 4.

In still another embodiment, the data transmission device may be the digital unit in the embodiment shown in FIG. 7.

Specifically, the transceiver apparatus is configured to perform step S203 in the embodiment shown in FIG. 7; and the processor is configured to perform steps S201, S202, and S204 in the embodiment shown in FIG. 7.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the unit division is merely logical function division and may be other division in actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium, or may be transmitted by using the computer-readable storage medium. The computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (read-only memory, ROM), a random access memory (RAM), or a magnetic medium such as a floppy disk, a hard disk, a magnetic tape, a magnetic disk, or an optical medium such as a digital versatile disc (DVD), or a semiconductor medium such as a solid-state drive (SSD).

What is claimed is:

1. A data transmission method, comprising:
receiving, by a radio unit RU, first uplink scheduling information sent by a digital unit DU;
predicting, by the RU based on a pilot signal estimation result of uplink data and/or at least one piece of historical information, a decoding result of the uplink data received by a base station;
determining, by the RU, second uplink scheduling information based on a predicted decoding result and the first uplink scheduling information;
sending, by the RU, the predicted decoding result and the second uplink scheduling information to a terminal; and
sending, by the RU, the predicted decoding result to the DU, wherein
the method further comprises:
collecting a quantity of initially transmitted blocks N in a specified period;
calculating, based on the predicted decoding result, a predicted quantity of error blocks $N_{pre}^{err}$ in initial transmission;
obtaining through calculation, a predicted initial block error rate IBLER based on N and $N_{pre}^{err}$;
calculating, based on the actual decoding result, an actual quantity of error blocks $N_{real}^{err}$ in the initial transmission;
obtaining through calculation, an actual IBLER based on N and $N_{real}^{err}$; and
adjusting a calibration deviation $SINR_{adj}$ of a signal to interference plus noise ratio SINR based on the predicted IBLER and the actual IBLER.

2. The method according to claim 1, wherein the predicting, by the RU based on a pilot signal estimation result of uplink data and/or at least one piece of historical information, a decoding result of the uplink data received by a base station comprises:
estimating, by the RU, a signal to interference plus noise ratio SINR based on the pilot signal estimation result of the uplink data;
calibrating, by the RU based on the SINR obtained by estimation and a calibration deviation $SINR_{adj}$ of the SINR, the SINR obtained by estimation;
obtaining, by the RU, a block error rate BLER based on the at least one piece of historical information, a calibrated SINR, and a mapping relationship between an SINR and a BLER; and
generating, by the RU, the predicted decoding result based on the obtained BLER.

3. The method according to claim 1, wherein the historical information comprises at least one of the following information: statistical information of a modulation and coding scheme MCS, a resource block RB, doppler, and the predicted decoding result.

4. The method according to claim 1, wherein the predicted decoding result comprises a positive acknowledgment ACK and a negative acknowledgment NACK, and the obtaining, by the RU, second uplink scheduling information based on a predicted decoding result and the first uplink scheduling information comprises:
determining, by the RU, that the second uplink scheduling information is the first uplink scheduling information if the predicted decoding result is the ACK; or
modifying the first uplink scheduling information to obtain the second uplink scheduling information if the predicted decoding result is the NACK.

5. The method according to claim 4, wherein the modifying the first uplink scheduling information to obtain the second uplink scheduling information if the predicted decoding result is the NACK comprises:
if the predicted decoding result is the NACK, and the first uplink scheduling information comprises scheduling information of the terminal, determining, by the RU, that the second uplink scheduling information is to schedule the terminal to perform retransmission by using an initial transmission scheduling resource; or
if the predicted decoding result is the NACK, and the first uplink scheduling information does not comprise scheduling information of the terminal, determining, by the RU based on whether a resource scheduled by the terminal in a previous retransmission transmission time interval TTI is occupied by another terminal in a current TTI, that the second uplink scheduling information is to schedule the terminal to perform non-adaptive retransmission or suspend a retransmission process of the terminal.

6. A data transmission method, comprising:
sending, by a digital unit DU, first uplink scheduling information to a radio unit RU;
receiving, by the DU, a predicted decoding result sent by the RU;
receiving, by the DU, uplink data sent by a terminal, and decoding the uplink data to obtain an actual decoding result; and
performing, by the DU, an error remedy for uplink data transmission based on the actual decoding result and the predicted decoding result,
wherein the performing, by the DU, an error remedy for uplink data transmission based on the actual decoding result and the predicted decoding result comprises one of:
when the actual decoding result is a positive acknowledgment ACK and the predicted decoding result is a negative acknowledgment NACK, determining, by the DU, that the predicted decoding result is falsely reported, and no remedy is required for the uplink data transmission; or
when the actual decoding result is a NACK, and the predicted decoding result is an ACK, determining, by the DU, that the uplink data is missed to be reported, and the remedy needs to be performed for the uplink data transmission.

7. The method according to claim 6, wherein after the determining, by the DU, that the uplink data is missed to be reported, and the remedy needs to be performed for the uplink data transmission, the method further comprises:
if a retransmission process of the terminal is suspended and a maximum quantity of retransmission times is not reached, scheduling the terminal to perform retransmission; or
if first uplink data buffered at a physical layer of the terminal has been cleared, transmitting second uplink data, wherein the second uplink data comprises retransmitted data of the first uplink data.

8. The method according to claim 6, wherein the method further comprises:
collecting a quantity of initially transmitted blocks N in a specified period;
calculating, based on the predicted decoding result, a predicted quantity of error blocks $N_{pre}^{err}$ in initial transmission;
obtaining through calculation, a predicted initial block error rate IBLER based on N and $N_{pre}^{err}$;
calculating, based on the actual decoding result, an actual quantity of error blocks $N_{pre}^{err}$ in the initial transmission;
obtaining through calculation, an actual IBLER based on N and $N_{pre}^{err}$; and
adjusting a calibration deviation $SINR_{adj}$ of a signal to interference plus noise ratio SINR based on the predicted IBLER and the actual IBLER.

9. A data transmission method, comprising:
predicting, by a digital unit DU, a decoding result of downlink data transmission based on at least one piece of historical information;
scheduling, by the DU, the downlink data transmission based on a predicted decoding result;
receiving, by the DU, an actual decoding result sent by a terminal; and
performing, by the DU, an error remedy for the downlink data transmission based on the predicted decoding result and the actual decoding result,
wherein the performing, by the DU, an error remedy for the downlink data transmission based on the predicted decoding result and the actual decoding result comprises one of:
when the actual decoding result is a positive acknowledgment ACK and the predicted decoding result is a negative acknowledgment NACK, determining, by the DU, that the predicted decoding result is falsely reported, and no remedy is required for the downlink data transmission; or
when the actual decoding result is the NACK, and the predicted decoding result is the ACK, determining, by the DU, that the downlink data is missed to be reported, and the remedy needs to be performed for the downlink data transmission.

10. The method according to claim 9, wherein the historical information comprises at least one of the following information: statistical information of an SINR, a modulation and coding scheme MCS, a resource block RB, doppler, and the predicted decoding result.

11. The method according to claim 9, wherein after the determining, by the DU, that the downlink data is missed to be reported, and the remedy needs to be performed for the downlink data transmission, the method further comprises:
if a retransmission process of the data is not occupied, retransmitting, by the DU, the data by using the retransmission process; or
if a retransmission process of the data is occupied, scheduling, by the DU, a new process to initially transmit the data.

12. The method according to claim 9, wherein the method further comprises:
collecting a quantity of initially transmitted blocks N in a specified period;
calculating, based on the predicted decoding result, a predicted quantity of error blocks $N_{pre}^{err}$ in initial transmission;
obtaining through calculation, a predicted initial block error rate IBLER based on N and $N_{pre}^{err}$;
calculating, based on the decoding result of the terminal, an actual quantity of error blocks $N_{real}^{err}$ in the initial transmission;
obtaining through calculation, an actual IBLER based on N and $N_{real}^{err}$; and
adjusting a calibration deviation $SINR_{adj}$ of the signal to interference plus noise ratio SINR based on the predicted IBLER and the actual IBLER.

* * * * *

UNITED STATES PATENT AND TRADEMARK OFFICE
CERTIFICATE OF CORRECTION

PATENT NO. : 11,606,181 B2
APPLICATION NO. : 17/098061
DATED : March 14, 2023
INVENTOR(S) : Zhihua Tang It is certified that error appears in the above-identified patent and that said Letters Patent is hereby corrected as shown below:

In the Claims

Claim 8: Column 25, Line 11: "quantity of error blocks $N_{pre}^{err}$ in the initial transmis-" should read -- quantity of error blocks $N_{real}^{err}$ in the initial transmis- --.

Claim 8: Column 25, Line 14: "N and $N_{pre}^{err}$; and" should read -- N and $N_{real}^{err}$; and --.

Signed and Sealed this
Twenty-seventh Day of June, 2023

Katherine Kelly Vidal
*Director of the United States Patent and Trademark Office*